US010377495B2

(12) United States Patent
Bammann et al.

(10) Patent No.: US 10,377,495 B2
(45) Date of Patent: Aug. 13, 2019

(54) RAM AIR CHANNEL ARRANGEMENT AND METHOD FOR OPERATING A RAM AIR CHANNEL ARRANGEMENT

(71) Applicant: Airbus Operations GmbH, Hamburg (DE)

(72) Inventors: Holger Bammann, Hamburg (DE); Alexander Solntsev, Hamburg (DE); Frank Klimpel, Hamburg (DE); Alexandre Broquet, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 350 days.

(21) Appl. No.: 15/267,387

(22) Filed: Sep. 16, 2016

(65) Prior Publication Data

US 2017/0081031 A1    Mar. 23, 2017

(30) Foreign Application Priority Data

Sep. 17, 2015    (DE) .................. 10 2015 217 804

(51) Int. Cl.
  B64D 13/04    (2006.01)
  B64D 13/06    (2006.01)
(52) U.S. Cl.
  CPC .......... *B64D 13/04* (2013.01); *B64D 13/06* (2013.01); *B64D 2013/0618* (2013.01); *Y02T 50/56* (2013.01)
(58) Field of Classification Search
  CPC .... B64D 13/04; B64D 13/06; B64D 13/0618; Y02T 50/56
  USPC ......................................................... 454/75
  See application file for complete search history.

(56) References Cited

U.S. PATENT DOCUMENTS

| 4,262,495 A | * | 4/1981 | Gupta | .................... B64D 13/06 62/172 |
| 4,535,606 A | * | 8/1985 | Rannenberg | ........... B64D 13/06 62/402 |
| 5,461,882 A | * | 10/1995 | Zywiak | .............. B60H 1/00007 62/401 |

(Continued)

FOREIGN PATENT DOCUMENTS

| DE | 102009017040 | 10/2010 |
| DE | 102013008620 | 11/2014 |

(Continued)

OTHER PUBLICATIONS

German Search Report, dated Aug. 3, 2016, priority document.

*Primary Examiner* — Steven B McAllister
*Assistant Examiner* — Allen R Schult
(74) *Attorney, Agent, or Firm* — Greer, Burns & Crain, Ltd.

(57) ABSTRACT

A ram air channel arrangement for ambient air supply into an aircraft comprises a ram air channel which has a ram air inlet channel and a ram air outlet channel arranged downstream of the ram air inlet channel and in fluid communication with the ram air inlet channel. The ram air channel arrangement further comprises a cabin exhaust air line which is adapted to have cabin exhaust air flow therethrough which has been removed from an aircraft cabin and which cabin exhaust air line is connected to the ram air inlet channel and is adapted to lead the cabin exhaust air into the ram air inlet channel.

19 Claims, 1 Drawing Sheet

(56) References Cited

U.S. PATENT DOCUMENTS

| | | | | |
|---|---|---|---|---|
| 5,967,461 A | * | 10/1999 | Farrington | B64D 13/06 |
| | | | | 244/118.5 |
| 7,305,842 B1 | | 12/2007 | Schiff | |
| 8,262,018 B2 | | 9/2012 | Scherer et al. | |
| 2014/0345305 A1 | | 11/2014 | Sieme et al. | |
| 2015/0329210 A1 | | 11/2015 | Bammann et al. | |
| 2016/0083100 A1 | | 3/2016 | Bammann et al. | |

FOREIGN PATENT DOCUMENTS

| | | |
|---|---|---|
| EP | 2947012 | 11/2015 |
| EP | 2998223 | 3/2016 |
| EP | 2998224 | 3/2016 |

\* cited by examiner

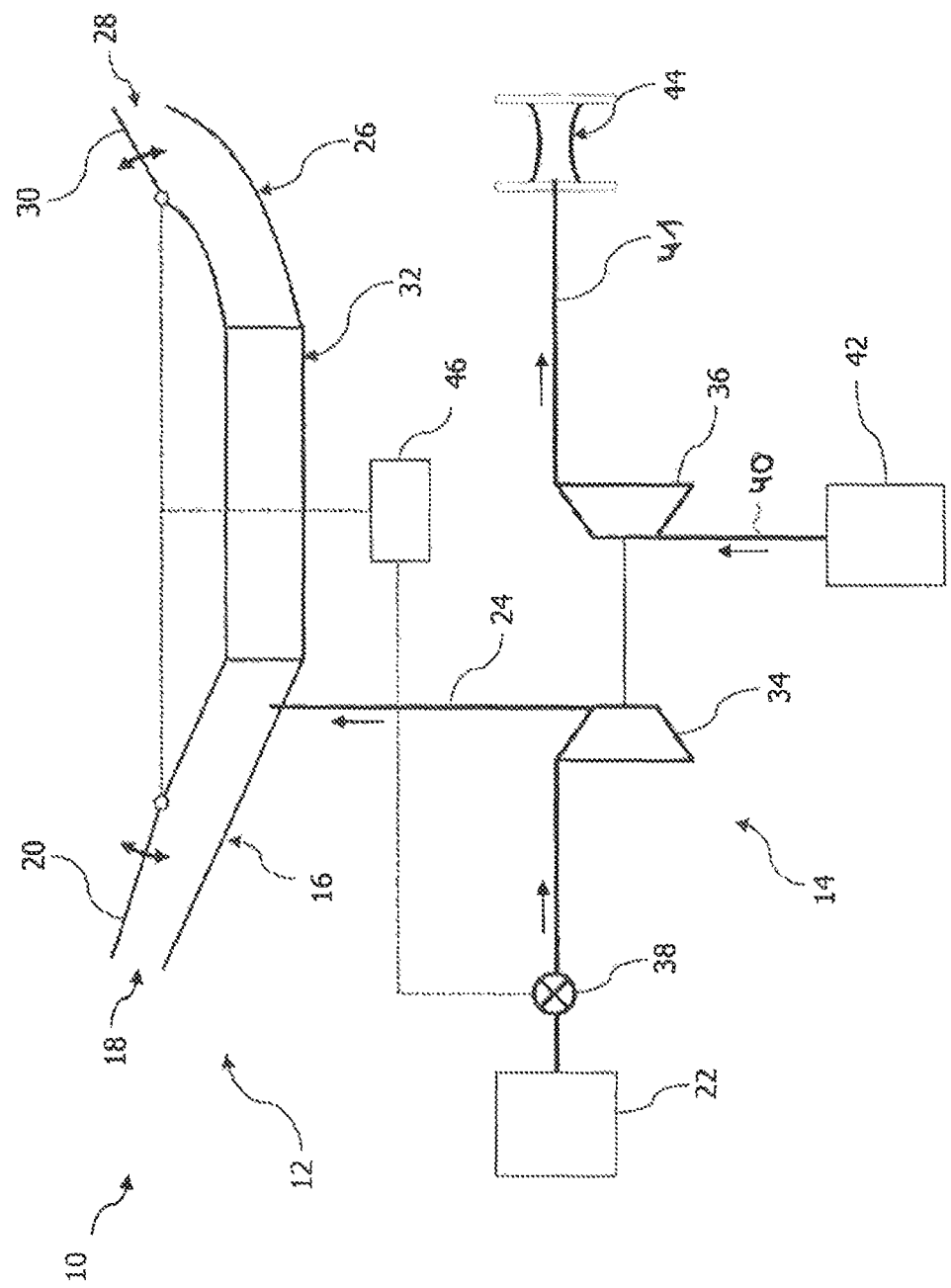

RAM AIR CHANNEL ARRANGEMENT AND METHOD FOR OPERATING A RAM AIR CHANNEL ARRANGEMENT

CROSS-REFERENCES TO RELATED APPLICATIONS

This application claims the benefit of the German patent application No. 10 2015 217 804.8 filed on Sep. 17, 2015, the entire disclosures of which are incorporated herein by way of reference.

BACKGROUND OF THE INVENTION

The invention relates to a ram air channel arrangement for ambient air supply into an aircraft and a method for operating such a ram air channel arrangement.

Ram air channels are used in modern aircraft for supplying various systems located on board the aircraft, such as, for example, an air conditioning system, with ambient air from the aircraft environment. Such ram air channels comprise an air inlet having a ram air inlet channel extending downstream of the air inlet, a ram air channel active portion extending downstream of the inlet channel and a ram air outlet channel extending downstream of the ram air channel active portion and having an air outlet at its downstream end. In the ram air channel active portion there may be arranged, for example, a heat exchanger of an air conditioning system of the aircraft, which is cooled by the cold ambient air flowing through the ram air channel During the flight, owing to the ram pressure which builds up in the ram air channel, ambient air flows through the air inlet into the ram air inlet channel and the ram air channel active portion, whereas when the aircraft is on the ground, mechanical devices, such as, for example, injectors or fans arranged in the ram air channel, are used for generating an ambient air flow through the ram air channel. Heated ambient air leaves the ram air channel through the ram air outlet channel.

In order to enable the ambient air flow supplied through the ram air channel to adapt to the ambient air requirement of the systems supplied with the ambient air, there is usually arranged in a region of the air inlet and in a region of the air outlet of the ram air channel in each case at least one movable element which allows, respectively, an enlargement and a diminution or a complete closure of the flow cross-section of the air inlet and of the air outlet.

In today's modern passenger aircraft, the ram air inlet channel is predominantly provided with an NACA (National Advisory Committee for Aeronautics) inlet arranged in the region of the aircraft outer skin and comprises a first and a second inlet flap which can be adjusted by a common actuator. When, in flight, the first and the second inlet flap are moved from a position closing the ram air inlet channel into an open position by actuation of the actuator, ambient air flows through the air inlet into the ram air inlet channel A conventional ram air outlet channel is equipped with an adjustable outlet flap, by which the ambient air flowing through the ram air channel is released to the aircraft environment. In dependence on the position of the inlet flaps and of the outlet flap which free the flow cross-section at the inlet and outlet of the ram air channel, the ambient air mass flow through the ram air channel can be set.

From DE 10 2009 017 040 A1 or U.S. Pat. No. 8,262,018 B2 there is known a method for controlling the inlet flaps and the outlet flaps of a ram air channel, which enables a minimization of the aerodynamic losses caused by the ram air channel.

SUMMARY OF THE INVENTION

An object on which the invention is based is to specify a ram air channel arrangement for ambient air supply into an aircraft and a method for operating such a ram air channel arrangement, which enable a reduction of the additional aerodynamic drag caused by the ram air channel when the aircraft is in flight.

A ram air channel arrangement for ambient air supply into an aircraft comprises a ram air channel which has a ram air inlet channel and a ram air outlet channel arranged downstream of the ram air inlet channel and in fluid communication with the ram air inlet channel. The term "downstream" here refers to the direction of the ambient air flow through the ram air channel A ram air channel active portion may be provided between the ram air inlet channel and the ram air outlet channel. In the ram air channel active portion, there may be arranged, for example, a heat exchanger of an aircraft air conditioning system, through which flows a fluid to be cooled by the ambient air flowing through the ram air channel. Furthermore, in the ram air channel there may be provided a conveying device which serves to convey ambient air through the ram air channel when the aircraft is on the ground.

The ram air channel arrangement further comprises a cabin exhaust air line, which is adapted to have cabin exhaust air flow through it which has been removed from an aircraft cabin. The cabin exhaust air flowing through the cabin exhaust air line is preferably air which has a temperature of approximately 30° C. and a pressure corresponding to the cabin pressure. The cabin exhaust air is usually drawn from a passenger cabin of the aircraft, which cabin is supplied with fresh air provided by an aircraft air conditioning system both when the aircraft is in flight and on the ground. Alternatively thereto, the cabin exhaust air which flows through the cabin exhaust air line of the ram air channel arrangement may, however, also be drawn from a cargo compartment, a cockpit or another pressurized aircraft region.

The cabin exhaust air line is connected to the ram air inlet channel and adapted to lead the cabin exhaust air, flowing through the cabin exhaust air line, into the ram air inlet channel. The cabin exhaust air is usually removed from an aircraft cabin into the environment via a cabin pressure control system. In contrast thereto, in the ram air channel arrangement described here, at least part of the cabin exhaust air removed from the aircraft cabin is supplied into the ram air inlet channel of the ram air channel. Consequently, mixed air, which contains ambient air from the aircraft environment and cabin exhaust air from the cabin exhaust air line, flows through the ram air channel.

Given a constant total air mass flow through the ram air channel, at least part of the ambient air fed into the ram air channel through the ram air inlet channel can thus be replaced by the cabin exhaust air which is led into the ram air inlet channel via the cabin exhaust air line. Consequently, less ambient air from the aircraft environment has to be supplied into the ram air channel. This makes it possible to reduce the aerodynamic losses caused by the ram air channel when the aircraft is in flight. As a result, the fuel consumption of the aircraft can be reduced.

The ram air channel arrangement according to the invention is distinguished by a simple and robust design. Furthermore, even in an existing ram air channel arrangement installed in an aircraft, the ram air channel can be connected in the region of its ram air inlet channel to a cabin exhaust air line and the ram air channel arrangement can thus be retrofitted in a ram air channel arrangement according to the invention in a comparatively simple manner.

In a preferred embodiment, the ram air channel arrangement further has a turbine arranged in the cabin exhaust air line. The turbine is adapted to expand the cabin exhaust air flowing through the cabin exhaust air line before it is supplied into the ram air inlet channel. As a result, part of the internal energy of the cabin exhaust air flowing through the cabin exhaust air line, e.g., the pressure energy of the cabin exhaust air, can be converted into kinetic energy of the turbine. Since the cabin exhaust air is led via the turbine and thereby expanded, the cabin exhaust air is cooled before being led into the ram air inlet channel. As a result, the cooling properties of the mixed air flowing through the ram air channel are improved.

The turbine may be connected in a torque-transmitting manner to a compressor. As a result, the compressor can be driven by the turbine. For example, the turbine and the compressor may be arranged on a common shaft. The compressor is preferably adapted to compress air to a pressure which is sufficient to accelerate the air, on expansion to the ambient pressure, to supersonic speed. The air accelerated to supersonic speed can then be released to the aircraft environment for thrust recovery.

To accelerate the air compressed by means of the compressor, the ram air channel arrangement may have a thrust recovery nozzle which is adapted to expand the air compressed in the compressor. The thrust recovery nozzle is preferably connected to an outlet of the compressor and adapted to release the air, flowing through the thrust recovery nozzle, to the aircraft environment. For example, the thrust recovery nozzle may be configured in the form of a de Laval nozzle and arranged in the region of an outer skin of the aircraft.

The compressor is preferably adapted to suck in air from a ventilated aircraft region, in particular a pack bay of the aircraft, and compress it. For this purpose, an inlet of the compressor may be connected to the ventilated aircraft region via an appropriate line. The compressor then fulfils the function of a conveying device for conveying exhaust air from the ventilated aircraft region.

The ram air inlet channel preferably comprises an inlet for leading ambient air from the aircraft environment into the ram air channel. In the region of this inlet, there is preferably arranged at least one movable inlet flap which serves to vary an inlet flow cross-section of the ram air inlet channel. When the inlet flap is open, ambient air flows through the inlet into the ram air inlet channel when the aircraft is in flight. On flowing through the ram air inlet channel, part of the dynamic pressure of the air flow is converted into static pressure. In order to intensify this effect, a diffuser may be arranged in the ram air inlet channel. The ram air outlet channel, by contrast, comprises an outlet for removing ambient air to the aircraft environment. In the region of this outlet, there is preferably provided at least one movable outlet flap which serves to vary an outlet flow cross-section of the ram air outlet channel.

By appropriate control of the positions of the inlet flap and of the outlet flap, the pressure in the ram air channel and consequently the mass flow of the air flowing through the ram air channel may be controlled as desired. The ram air channel arrangement is therefore preferably equipped with a control unit which is adapted to control the air mass flow through the ram air channel, which may contain ambient air from the aircraft environment and/or cabin exhaust air from the cabin exhaust air line. The control of the air mass flow through the ram air channel by means of the control unit is preferably effected by appropriate control of the movable inlet flap, which is arranged in the region of the inlet of the ram air inlet channel and adapted to set the inlet flow cross-section of the ram air inlet channel and by appropriate control of the movable outlet flap, which is arranged in the region of the outlet of the ram air outlet channel and adapted to set the outlet flow cross-section of the ram air outlet channel Substantial adaptation of the control logic used in previous ram air channel arrangements for controlling the ambient air flow through the ram air channel is not necessary for this.

The control unit may be adapted to control the supply of ambient air into the ram air inlet channel in dependence on a cabin exhaust air mass flow supplied to the ram air inlet channel via the cabin exhaust air line. In particular, the control unit may be adapted to prioritize the cabin exhaust air flow over an ambient air flow to be supplied from the aircraft environment into the ram air inlet channel, in the realization of a required air mass flow through the ram air channel.

In a preferred embodiment of the ram air channel arrangement, the control unit is adapted to determine whether the air mass flow through the ram air channel is greater than a setpoint. The setpoint may, for example, correspond to a current air mass flow requirement of the systems on board the aircraft which are supplied with air by means of the ram air channel. If the air mass flow through the ram air channel is greater than the setpoint, preferably firstly the supply of ambient air into the ram air inlet channel is reduced under the control of the control unit. Only if, on complete interruption of the supply of ambient air into the ram air inlet channel, the air mass flow through the ram air channel is still greater than the setpoint, the supply of cabin exhaust air into the ram air inlet channel may be reduced. Accordingly, if the air mass flow through the ram air channel is less than the setpoint, firstly the supply of cabin exhaust air into the ram air inlet channel may be increased under the control of the control unit before, if, on a maximization of the cabin exhaust air mass flow into the ram air inlet channel, the air mass flow through the ram air channel is still less than the setpoint, the supply of ambient air into the ram air inlet channel may be increased.

Such a control of the supply of ambient air into the ram air inlet channel in dependence on the cabin exhaust air mass flow supplied to the ram air inlet channel enables the minimization of the ambient air supply into the ram air inlet channel and thus the minimization of the aerodynamic losses caused by the ram air channel. At the same time, it is ensured that the air requirement of the systems on board the aircraft which are supplied with air by means of the ram air channel is met.

Fundamentally an enlargement of the inlet flow cross-section of the ram air inlet channel by opening the inlet flap brings about an increase of the pressure in the ram air inlet channel. Accordingly, by a diminution of the inlet flow cross-section of the ram air inlet channel by closing the inlet flap, the pressure in the ram air inlet channel is reduced. Conversely, a diminution of the outlet flow cross-section of the ram air outlet channel by closing the outlet flap causes an increase of the pressure in the ram air inlet channel, whereas an enlargement of the outlet flow cross-section of the ram air outlet channel by opening the outlet flap results in a reduction of the pressure in the ram air inlet channel.

To reduce the supply of ambient air into the ram air inlet channel, the control unit may therefore control the inlet flap in such a way that the inlet flow cross-section of the ram air inlet channel is diminished. Furthermore, the control unit may be adapted to control the outlet flap in such a way that the outlet flow cross-section of the ram air outlet channel is diminished and thus the pressure in the ram air inlet channel is increased in order to reduce the supply of cabin exhaust air into the ram air inlet channel. The further the outlet flap is closed, the more thrust recovery is possible through the air flowing out of the outlet of the ram air outlet channel. To increase the supply of cabin exhaust air into the ram air inlet channel, the control unit may furthermore control the outlet flap in such a way that the outlet flow cross-section of the ram air outlet channel is enlarged and thus the pressure in the ram air inlet channel is reduced. Finally, the control unit, for increase of the supply of ambient air into the ram air inlet channel, may control the inlet flap in such a way that the inlet flow cross-section of the ram air inlet channel is enlarged.

A control unit of the ram air channel arrangement, which may be configured integrated with the control unit for controlling the air mass flow through the ram air channel, may be adapted to control the cabin exhaust air mass flow through the cabin exhaust air line, i.e., the cabin exhaust air mass flow which is led through the cabin exhaust air line to the turbine. For this purpose, the control unit may, for example, control a control valve which is arranged in the cabin exhaust air line upstream of the turbine. The term "upstream" here refers to the flow direction of the cabin exhaust air through the cabin exhaust air line. Preferably, the control unit is adapted to interrupt, for example by closing the control valve, the cabin exhaust air mass flow to the turbine in a fault state of the turbine and/or of the compressor connected to the turbine.

In the event of an interruption of the cabin exhaust air supply to the turbine and consequently into the ram air inlet channel, the control unit controls, for control of the air mass flow through the ram air channel, the supply of ambient air into the ram air channel, preferably as in conventional ram air channel arrangements, in such a way that the air requirement of the aircraft systems supplied with air by means of the ram air channel is met exclusively by the ambient air flow led through the ram air channel. As a result, even in the event of a malfunction of the turbine and/or of the compressor connected to the turbine, a proper supply of these systems with air is ensured.

A control unit of the ram air channel arrangement, which may be configured integrated with the control unit for controlling the air mass flow through the ram air channel and/or integrated with the control unit for controlling the cabin exhaust air mass flow through the cabin exhaust air line, may be adapted to control the cabin exhaust air mass flow through the cabin exhaust air line and, in particular, the cabin exhaust air mass flow to the turbine, for example by appropriate control of the control valve arranged in the cabin exhaust air line upstream of the turbine, in dependence on a difference between a pressure in the aircraft cabin and the ambient pressure in the aircraft environment. Preferably, the control unit allows a cabin exhaust air mass flow to the turbine only if the difference between the pressure in the aircraft cabin and the ambient pressure in the aircraft environment exceeds a threshold value. By such a pressure-differential-dependent control of the cabin exhaust air supply to the turbine, the bearings of the turbine or of the compressor/turbine arrangement can be protected from damage.

In a method for operating a ram air channel arrangement for ambient air supply into an aircraft, which arrangement has a ram air channel having a ram air inlet channel and a ram air outlet channel arranged downstream of the ram air inlet channel and in fluid communication with the ram air inlet channel, cabin exhaust air removed from an aircraft cabin is led into the ram air inlet channel.

The cabin exhaust air, before it is supplied into the ram air inlet channel, is preferably expanded in a turbine, the turbine preferably being connected in a torque-transmitting manner to a compressor. The compressor may be adapted to compress air to a pressure which is sufficient to accelerate the air to supersonic speed.

Air compressed by the compressor may be expanded by a thrust recovery nozzle connected to the compressor and removed to the aircraft environment. Additionally or alternatively thereto, the compressor may suck in exhaust air from a ventilated aircraft region, in particular a pack bay of the aircraft, and compress it.

In a further development of the method, an air mass flow through the ram air channel may be controlled by appropriate control of a movable inlet flap which is arranged in the region of an inlet of the ram air inlet channel and is adapted to set an inlet flow cross-section of the ram air inlet channel, and/or of a movable outlet flap which is arranged in the region of an outlet of the ram air outlet channel and is adapted to set an outlet flow cross-section of the ram air outlet channel.

The supply of ambient air into the ram air inlet channel may be controlled in dependence on a cabin exhaust air mass flow supplied to the ram air inlet channel via the cabin exhaust air line. In particular, it may be determined whether the air mass flow through the ram air channel is greater than a setpoint. If the air mass flow through the ram air channel is greater than the setpoint, firstly the supply of ambient air into the ram air inlet channel may be reduced. The supply of cabin exhaust air into the ram air inlet channel is preferably reduced only if, on complete interruption of the supply of ambient air into the ram air inlet channel, the air mass flow through the ram air channel is still greater than the setpoint. If the air mass flow through the ram air channel is less than the setpoint, firstly the supply of cabin exhaust air into the ram air inlet channel may be increased. The supply of ambient air into the ram air inlet channel is preferably increased only if, on a maximization of the cabin exhaust air mass flow into the ram air inlet channel, the air mass flow through the ram air channel is still less than the setpoint.

For reduction of the supply of ambient air into the ram air inlet channel, the inlet flap may be controlled in such a way that the inlet flow cross-section of the ram air inlet channel is diminished. For reduction of the supply of cabin exhaust air into the ram air inlet channel, the outlet flap may be controlled in such a way that the outlet flow cross-section of the ram air outlet channel is diminished. For increase of the supply of cabin exhaust air into the ram air inlet channel, the outlet flap may be controlled in such a way that the outlet flow cross-section of the ram air outlet channel is enlarged. For increase of the supply of ambient air into the ram air inlet channel, the inlet flap may be controlled in such a way that the inlet flow cross-section of the ram air inlet channel is enlarged.

A cabin exhaust air mass flow through the cabin exhaust air line and in particular a cabin exhaust air mass flow to the turbine may be controlled by appropriate control of a control valve arranged in the cabin exhaust air line, in particular upstream of the turbine. The cabin exhaust air mass flow to the turbine is preferably interrupted in a fault state of the turbine and/or of the compressor.

The cabin exhaust air mass flow through the cabin exhaust air line, and in particular the cabin exhaust air mass flow to the turbine, may be controlled, in particular, by appropriate control of the control valve arranged in the cabin exhaust air line, in dependence on a difference between a pressure in the aircraft cabin and the ambient pressure in the aircraft environment. Preferably, a cabin exhaust air mass flow to the turbine is allowed only if the difference between the pressure in the aircraft cabin and the ambient pressure in the aircraft environment exceeds a threshold value.

BRIEF DESCRIPTION OF THE DRAWINGS

In what follows, preferred embodiments of the invention are explained in more detail with the aid of the attached schematic drawing, in which FIG. 1 shows a schematic illustration of a ram air arrangement.

DETAILED DESCRIPTION OF THE PREFERRED EMBODIMENTS

In the FIGURE there is shown an exemplary ram air channel arrangement 10 for ambient air supply into an aircraft. The ram air channel arrangement 10 comprises a ram air channel 12 having a ram air inlet channel 16 which is provided with an inlet 18 for leading ambient air from the aircraft environment into the ram air inlet channel 12. In the region of the inlet 18 of the ram air inlet channel 16 there is arranged a movable inlet flap 20 which is adjustable in its position by means of an actuator (not shown). The inlet flap 20 serves to set an inlet flow cross-section of the ram air inlet channel 16 which influences an ambient air mass flow flowing into the ram air channel 12 and a pressure prevailing in the ram air inlet channel 16.

An opening of the inlet flap 20 causes an enlargement of the inlet flow cross-section of the ram air inlet channel 16 and an increase of the ambient air mass flow through the ram air channel 12. This results in an increase of the pressure prevailing in the ram air inlet channel 16. By contrast, a closing of the inlet flap 20 causes a diminution of the inlet flow cross-section of the ram air inlet channel 16 and consequently a decrease of the ambient air mass flow through the ram air channel 12. This results in a decrease of the pressure in the ram air inlet channel 12.

The ram air channel 12 further comprises a ram air outlet channel 26 arranged downstream of the ram air inlet channel 16 and in fluid communication with the ram air inlet channel 16. The term "downstream" here refers to the direction of the ambient air flow through the ram air channel 12. The ram air outlet channel 26 is provided with an outlet 28 for leading air from the ram air channel 12 into the aircraft environment. In the region of the outlet 28 there is arranged a movable outlet flap 30 which is adjustable in its position by means of an actuator (not shown). The outlet flap 30 serves to set an outlet flow cross-section of the ram air outlet channel 26.

An opening of the outlet flap 30 causes an enlargement of the outlet flow cross-section of the ram air outlet channel 26 and a decrease of the pressure prevailing in the ram air outlet channel 26 and the ram air inlet channel 16. By contrast, a closing of the outlet flap 30 results in a diminution of the outlet flow cross-section of the ram air outlet channel 26 and an increase of the pressure in the ram air outlet channel 26 and the ram air inlet channel 16.

A heat exchanger 32, through which flows a fluid to be cooled, is arranged in the ram air channel 12 between the ram air inlet channel 16 and the ram air outlet channel 26. In the heat exchanger 32 the fluid to be cooled is brought into thermal contact with the air flowing through the ram air channel 12 and thereby cooled. The heat exchanger 32 may, for example, be a component of an aircraft air conditioning system.

The ram air channel arrangement 10 further comprises a cabin exhaust air line 24. The cabin exhaust air line 24 is connected to the ram air inlet channel 16 and cabin exhaust air removed from an aircraft cabin 22 can flow through the line. The cabin exhaust air line 24 is thus adapted to lead cabin exhaust air removed from the aircraft cabin 22 into the ram air inlet channel 16. Given a constant total air mass flow through the ram air channel 12, at least part of the ambient air fed into the ram air channel 12 through the ram air inlet channel 16 can thus be replaced by the cabin exhaust air which is led into the ram air inlet channel 16 via the cabin exhaust air line 24.

The ram air channel arrangement 10 further comprises a turbine/compressor arrangement 14. The turbine/compressor arrangement 14 has a turbine 34 and a compressor 36 which are connected to one another in a torque-transmitting manner, so that mechanical energy released in the turbine 34 is transmitted as driving energy to the compressor 36. The turbine 34 is arranged in the cabin exhaust air line 24 and adapted to expand and thereby cool the cabin exhaust air flowing through the cabin exhaust air line 24 before being supplied into the ram air inlet channel 16. The supply of cabin exhaust air to the turbine 34 is controlled by means of the control valve 38 which is arranged upstream of the turbine 34 in the cabin exhaust air line 24. The term "upstream" here refers to the direction of the cabin exhaust air flow through the cabin exhaust air line.

The compressor 36 driven by the turbine 34 is connected on the input side, via a first exhaust air line 40, to an aircraft region 42 to be ventilated. The aircraft region 42 to be ventilated may, for example, be a pack bay of the aircraft. The compressor 36 is adapted to suck in exhaust air from the aircraft region 42 and compress it to a pressure which is sufficient to accelerate the exhaust air, on expansion to the ambient pressure, to supersonic speed. An outlet of the compressor 36 is connected via a second exhaust air line 41 to a thrust recovery nozzle 44 which is arranged in an outer skin of the aircraft. The thrust recovery nozzle 44 is configured in the form of a de Laval nozzle which expands the exhaust air compressed by the compressor 36 and thereby accelerates it to supersonic speed. The exhaust air thus accelerated is released via the thrust recovery nozzle 44 to the aircraft environment, whereby a propulsive force acts on the aircraft.

The ram air channel arrangement 10 further comprises a control unit 46 which is adapted to control the operation of the inlet flap 20, the operation of the outlet flap 30 and the operation of the control valve 38. In particular, the control unit 46 controls, by appropriate control of the inlet flap 20 and of the outlet flap 30, an air mass flow through the ram air channel 12, where the air flowing through the ram air channel 12 may be either exclusively ambient air, exclusively cabin exhaust air or mixed air containing both ambient air and cabin exhaust air.

The supply of ambient air into the ram air inlet channel 16 is controlled by the control unit 46 in dependence on a cabin exhaust air mass flow supplied to the ram air inlet channel 16 via the cabin exhaust air line 24, where the cabin exhaust air flow in the realization of a required air mass flow through the ram air channel 12 is prioritized over an ambient air flow to be supplied from the aircraft environment into the ram air inlet channel 16. In order to realize such a control of the ambient air supply into the ram air inlet channel 16, the control unit 46 determines whether the air mass flow through the ram air channel 12 is greater than a setpoint. The setpoint may, for example, be a current air mass flow requirement of the heat exchanger 32 supplied with air by means of the ram air channel 12.

If the air mass flow through the ram air channel 12 is greater than the setpoint, firstly the supply of ambient air into the ram air inlet channel 16 is decreased under the control of the control unit 46. For this purpose, the inlet flap 20 is controlled by the control unit 46 in such a way that the inlet flow cross-section of the ram air inlet channel 16 is diminished, i.e., the inlet flap 20 is increasingly closed under the control of the control unit 46. Only when, on complete interruption of the supply of ambient air into the ram air inlet channel 16, the air mass flow through the ram air channel 12 is still greater than the setpoint, is the supply of cabin exhaust air into the ram air inlet channel 16 decreased. That is to say, only when the inlet flap 20 is completely closed, but the air mass flow through the ram air channel 12 still exceeds the setpoint, does the control unit 46 decrease the supply of cabin exhaust air into the ram air inlet channel 16. For this purpose, the control unit 46 controls the outlet flap 30 in such a way that the outlet flow cross-section of the ram air outlet channel 26 is diminished, i.e., the outlet flap 30 is increasingly closed and consequently the pressure in the ram air inlet channel 16 is increased.

Accordingly, if the air mass flow through the ram air channel 12 is less than the setpoint, firstly the supply of cabin exhaust air into the ram air inlet channel 16 is increased under the control of the control unit 46. For this purpose, the control unit 46 controls the outlet flap 30 in such a way that the outlet flow cross-section of the ram air outlet channel 26 is enlarged, i.e., the outlet flap 30 is increasingly opened and consequently the pressure in the ram air inlet channel 16 is decreased. Only when, on a maximization of the cabin exhaust air mass flow into the ram air inlet channel 16, the air mass flow through the ram air channel 12 is still less than the setpoint, does the control unit 46 increase the supply of ambient air into the ram air inlet channel 16. For this purpose, the control unit 46 controls the inlet flap 20 in such a way that the inlet flow cross-section of the ram air inlet channel 16 is enlarged, i.e., the inlet flap 20 is increasingly opened under the control of the control unit 46.

The cabin exhaust air mass flow from the aircraft cabin 22 to the turbine 34 is controlled by the control unit 46 by appropriate control of the control valve 38. In particular, the control unit 46 controls the control valve 38 in a fault state of the turbine 34 and/or of the compressor 36 into its closed position, so that the cabin exhaust air mass flow to the turbine 34 and the ram air inlet channel 16 is interrupted. The control of the control valve 38 is effected furthermore in dependence on a difference between a pressure in the aircraft cabin 22 and an ambient pressure in the aircraft environment. If it is ascertained by the control unit 46 that the difference between the pressure in the aircraft cabin 22 and the ambient pressure in the aircraft environment falls below a threshold value, the cabin exhaust air mass flow to the turbine 34 is interrupted.

In the event of an interruption of the cabin exhaust air supply to the turbine 34 and consequently into the ram air inlet channel 16, the control unit 46 controls the supply of ambient air into the ram air channel 12 as in conventional ram air channel arrangements in such a way that the air requirement of the heat exchanger 32 is met exclusively by the ambient air flow led through the ram air channel 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A ram air channel arrangement for ambient air supply into an aircraft comprising:
    a ram air channel which comprises a ram air inlet channel and a ram air outlet channel arranged downstream of the ram air inlet channel and in fluid communication with the ram air inlet channel,
    a cabin exhaust air line which is adapted to have cabin exhaust air flow therethrough which has been removed from an aircraft cabin and which cabin exhaust air line is connected to the ram air inlet channel and is adapted to lead the cabin exhaust air into the ram air inlet channel,
    a control unit which is adapted to control an air mass flow through the ram air channel by appropriate control of at least one of a movable inlet flap which is arranged in a region of an inlet of the ram air inlet channel and is adapted to set an inlet flow cross-section of the ram air inlet channel and of a movable outlet flap which is arranged in a region of an outlet of the ram air outlet channel and is adapted to set an outlet flow cross-section of the ram air outlet channel,
    wherein the control unit is adapted to control the supply of ambient air into the ram air inlet channel based on a cabin exhaust air mass flow supplied to the ram air inlet channel via the cabin exhaust air line.

2. The ram air channel arrangement according to claim 1, wherein in the cabin exhaust air line there is arranged a turbine which is adapted to expand the cabin exhaust air flowing through the cabin exhaust air line before it is supplied into the ram air inlet channel.

3. The ram air channel arrangement according to claim 2, wherein the turbine is connected in a torque-transmitting manner to a compressor which is adapted to compress air to a pressure sufficient to accelerate the air, on expansion to the ambient pressure, to supersonic speed.

4. The ram air channel arrangement according to claim 3, further comprising a thrust recovery nozzle, connected to the compressor, for expansion of the air compressed by the compressor and for removing the air flowing through the thrust recovery nozzle to the aircraft environment, the compressor being adapted to suck in exhaust air from a ventilated aircraft region of the aircraft, and to compress it.

5. The ram air channel arrangement according to claim 1, the control unit being adapted:
    to determine whether the air mass flow through the ram air channel is greater than a setpoint, if the air mass flow through the ram air channel is greater than the setpoint, firstly to reduce the supply of ambient air into the ram air inlet channel and only reduce the supply of cabin exhaust air into the ram air inlet channel if, on complete interruption of the supply of ambient air into the ram air inlet channel, the air mass flow through the ram air channel is still greater than the setpoint, and if the air mass flow through the ram air channel is less than the setpoint, firstly to increase the supply of cabin exhaust air into the ram air inlet channel and only increase the supply of ambient air into the ram air inlet channel if, on a maximization of the cabin exhaust air mass flow into the ram air inlet channel, the air mass flow through the ram air channel is still less than the setpoint.

6. The ram air channel arrangement according to claim 5, wherein the control unit is adapted to control the inlet flap in such a way that the inlet flow cross-section of the ram air inlet channel is diminished, to reduce the supply of ambient air into the ram air inlet channel, to control the outlet flap in such a way that the outlet flow cross-section of the ram air outlet channel is diminished, to reduce the supply of cabin exhaust air into the ram air inlet channel, to control the outlet flap in such a way that the outlet flow cross-section of the ram air outlet channel is enlarged, to increase the supply of cabin exhaust air into the ram air inlet channel, and to control the inlet flap in such a way that the inlet flow cross-section of the ram air inlet channel is enlarged, to increase the supply of ambient air into the ram air inlet channel.

7. The ram air channel arrangement according to claim 1, wherein a control unit is adapted to control a cabin exhaust air mass flow through the cabin exhaust air line by appropriate control of a control valve arranged in the cabin exhaust air line, upstream of the turbine, the control unit being adapted to interrupt the cabin exhaust air mass flow to the turbine in a fault state of at least one of the turbine and the compressor.

8. The ram air channel arrangement according to claim 1, wherein a control unit is adapted to control the cabin exhaust air mass flow through the cabin exhaust air line, by appropriate control of a control valve arranged in the cabin exhaust air line, in dependence on a difference between a pressure in the aircraft cabin and the ambient pressure in the aircraft environment, the control unit being adapted to allow a cabin exhaust air mass flow to the turbine only if the difference between the pressure in the aircraft cabin and the ambient pressure in the aircraft environment exceeds a threshold value.

9. A method for operating a ram air channel arrangement for ambient air supply into an aircraft, which arrangement comprises a ram air channel having a ram air inlet channel and a ram air outlet channel arranged downstream of the ram air inlet channel and in fluid communication with the ram air inlet channel, the method comprising the step of:

leading cabin exhaust air removed from an aircraft cabin into the ram air inlet channel, controlling an air mass flow through the ram air channel by appropriate control of a movable inlet flap which is arranged in a region of an inlet of the ram air inlet channel and is adapted to set an inlet flow cross-section of the ram air inlet channel and of a movable outlet flap which is arranged in a region of an outlet of the ram air outlet channel and is adapted to set an outlet flow cross-section of the ram air outlet channel, wherein the supply of ambient air into the ram air inlet channel is controlled based on a cabin exhaust air mass flow supplied to the ram air inlet channel via the cabin exhaust air line.

10. The method according to claim 9, wherein the cabin exhaust air, before the cabin exhaust air is supplied into the ram air inlet channel, is expanded in a turbine.

11. The method according to claim 9, wherein the turbine is connected in a torque-transmitting manner to a compressor which is adapted to compress air to a pressure which is sufficient to accelerate the air to supersonic speed.

12. The method according to claim 11, wherein air compressed by the compressor is expanded by a thrust recovery nozzle connected to the compressor and removed to the aircraft environment.

13. The method according to claim 11, wherein the compressor sucks in exhaust air from a ventilated aircraft region of the aircraft, and compresses it.

14. The method according to claim 13, wherein:

it is determined whether the air mass flow through the ram air channel is greater than a setpoint, if the air mass flow through the ram air channel is greater than the setpoint, firstly the supply of ambient air into the ram air inlet channel is reduced and the supply of cabin exhaust air into the ram air inlet channel is reduced only if, on complete interruption of the supply of ambient air into the ram air inlet channel, the air mass flow through the ram air channel is still greater than the setpoint, and if the air mass flow through the ram air channel is less than the setpoint, firstly the supply of cabin exhaust air into the ram air inlet channel is increased and the supply of ambient air into the ram air inlet channel is increased only if, on a maximization of the cabin exhaust air mass flow into the ram air inlet channel, the air mass flow through the ram air channel is still less than the setpoint.

15. The method according to claim 14, wherein for reduction of the supply of ambient air into the ram air inlet channel, the inlet flap is controlled in such a way that the inlet flow cross-section of the ram air inlet channel is diminished, for reduction of the supply of cabin exhaust air into the ram air inlet channel, the outlet flap is controlled in such a way that the outlet flow cross-section of the ram air outlet channel is diminished, for increase of the supply of cabin exhaust air into the ram air inlet channel, the outlet flap is controlled in such a way that the outlet flow cross-section of the ram air outlet channel is enlarged, and for increase of the supply of ambient air into the ram air inlet channel, the inlet flap is controlled in such a way that the inlet flow cross-section of the ram air inlet channel is enlarged.

16. The method according to claim 9, wherein a cabin exhaust air mass flow through the cabin exhaust air line is controlled by appropriate control of a control valve arranged in the cabin exhaust air line, upstream of the turbine, the cabin exhaust air mass flow to the turbine being interrupted in a fault state of at least one of the turbine and the compressor.

17. The method according to claim 9, wherein the cabin exhaust air mass flow through the cabin exhaust air line is controlled, by appropriate control of a control valve arranged in the cabin exhaust air line, in dependence on a difference between a pressure in the aircraft cabin and the ambient pressure in the aircraft environment, a cabin exhaust air mass flow to the turbine being allowed only if the difference between the pressure in the aircraft cabin and the ambient pressure in the aircraft environment exceeds a threshold value.

18. The ram air channel arrangement according to claim 1, wherein the control unit controls the supply of ambient air into the ram air inlet channel in dependence on the cabin exhaust air mass flow supplied to the ram air inlet channel via the cabin exhaust air line by controlling the movable inlet flap.

19. The method according to claim 9, wherein the control unit controls the supply of ambient air into the ram air inlet channel in dependence on the cabin exhaust air mass flow supplied to the ram air inlet channel via the cabin exhaust air line by controlling the movable inlet flap.

* * * * *